United States Patent
Li et al.

(10) Patent No.: US 10,031,526 B1
(45) Date of Patent: Jul. 24, 2018

(54) VISION-BASED DRIVING SCENARIO GENERATOR FOR AUTONOMOUS DRIVING SIMULATION

(71) Applicant: Baidu USA LLC, Sunnyvale, CA (US)

(72) Inventors: Zhang Li, Sunnyvale, CA (US); Jun Zhan, Sunnyvale, CA (US); Yiqing Yang, Sunnyvale, CA (US); Xuan Liu, Sunnyvale, CA (US); Yu Cao, Sunnyvale, CA (US); Siyang Yu, Sunnyvale, CA (US); Guang Yang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 15/640,885

(22) Filed: Jul. 3, 2017

(51) Int. Cl.
*G05D 1/00* (2006.01)
*G01S 19/03* (2010.01)
*G05D 1/02* (2006.01)
*G06N 3/08* (2006.01)

(52) U.S. Cl.
CPC ............ *G05D 1/0246* (2013.01); *G01S 19/03* (2013.01); *G05D 1/0088* (2013.01); *G05D 1/027* (2013.01); *G05D 1/0278* (2013.01); *G06N 3/08* (2013.01)

(58) Field of Classification Search
CPC .... G05D 1/027; G05D 1/0278; G05D 1/0246; G05D 1/0088; G01S 19/03; G06N 3/08
USPC .......................................................... 701/28
See application file for complete search history.

(56) References Cited

U.S. PATENT DOCUMENTS

| 2009/0116764 | A1* | 5/2009 | Liu ........................ G06T 3/4038 382/284 |
| 2011/0215950 | A1* | 9/2011 | Wagner ............... G01C 21/3632 340/995.14 |
| 2013/0162665 | A1* | 6/2013 | Lynch ................. G01C 21/3647 345/589 |
| 2015/0269714 | A1* | 9/2015 | Boitard .................... G06T 5/009 382/274 |

* cited by examiner

*Primary Examiner* — Tan Q Nguyen
(74) *Attorney, Agent, or Firm* — Womble Bond Dickinson (US) LLP (57) ABSTRACT

Described is a system (and method) for generating a driving scenario for an autonomous driving simulator. The system may use a camera mounted to a vehicle as a cost effective approach to obtain real-life driving scenario data. The system may then analyze the two-dimensional image data to create a three-dimensional driving simulation. The analysis may include detecting objects (e.g. vehicles, pedestrians, etc.) within the two-dimensional image data and determining movements of the object based on a position, trajectory, and velocity of the object. The determined information of the object may then be projected onto a map that may be used for generating the three-dimensional driving simulation. The use of cost-effective cameras provides the ability to obtain vast amounts of driving image data that may be used to provide an extensive coverage of the potential types of driving scenarios an autonomous vehicle may encounter.

20 Claims, 8 Drawing Sheets

VISION-BASED DRIVING SCENARIO GENERATOR FOR AUTONOMOUS DRIVING SIMULATION

TECHNICAL FIELD

Embodiments of the present disclosure relate generally to an autonomous driving simulation. More particularly, embodiments of the disclosure relate to generating driving scenario data for an autonomous driving simulation.

BACKGROUND

When developing autonomous driving systems, driving simulations are often used to test various components (e.g. decision systems) that may be implemented as part of an autonomous driving vehicle. Accordingly, the quality of the simulation provides a direct relationship to the performance of the autonomous driving vehicle. Simulations are often developed using manually inputted driving scenarios that require extensive configuration efforts. Manual configuration of simulations, however, are understandably limited and often do not provide the potential driving scenarios that may be encountered in real life situations. In addition, complex data from an autonomous driving vehicle itself may also be analyzed. This information, however, is also difficult to gather as it requires a fleet of autonomous driving vehicles to capture the potentially limitless driving scenarios in which a vehicle may encounter. Accordingly, there is a continued need to improve methods in which driving scenarios for autonomous driving simulations are developed.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

Described is a system (and method) for generating a driving scenario for an autonomous driving simulator. The driving scenario data may be derived from image data captured from cameras mounted to a vehicle. The use of cost-effective cameras provides the ability to obtain vast amounts of driving image data that may be used to provide an extensive coverage of the potential types of driving scenarios an autonomous vehicle may encounter.

In one embodiment, a driving simulator may use driving scenario data to overly objects onto a base map (e.g. high definition map) to create a driving simulation. To generate the driving scenario data, the system may use two-dimensional image data (e.g. from a camera) as a cost effective approach to obtain real-life driving scenarios. The system may analyze the captured image data (e.g. video) and may identify objects (e.g. vehicles, pedestrians, etc.) within the two-dimensional image data and determine movement characteristics of the object such as a position and a velocity of the object. For example, the system may determine movement characteristics of an identified object based on measuring a size of the object throughout a sequence of the images (e.g. set of frames). Absolute values (or values relative to a base map) of the determined movement characteristics of the object may then be determined based on additional information of the positioning and velocity of the image capturing vehicle itself.

For example, GPS location information or inertia information from sensors of the image capturing vehicle may be provided and synchronized with the captured image data. For instance, an absolute position (e.g. position of the image capturing vehicle on the base map) may be determined based on the GPS location information. Thus, an absolute position of the identified object may be extrapolated from such information. Accordingly, the determined movement characteristics of the identified object may then be included as driving scenario data to be used by a driving simulator. For example, the driving scenario data may include information related to the type of object, the position, velocity, and trajectory of the object, and any other information. Accordingly, this driving scenario data may be provided to the driving simulator to project the object onto a base map to generate a three-dimensional driving simulation. The driving simulation may be used to perform testing of various autonomous driving systems of components. For example, the driving scenario data may be used to perform unit testing of various modules or components of an autonomous driving system.

Accordingly, the system provides verisimilitude of an extensive set of driving scenarios in a cost effective manner. As a result, the generated simulations may be an important component of improving the overall performance and safety of autonomous driving systems. As further described herein with reference to FIGS. 1-3, the system may include an image capturing vehicle that captures live driving image data that is used by a simulation generating system to generate driving scenario data. Accordingly, as described, the system may analyze two-dimensional image data to create three-dimensional driving simulation data.

Figure 1:
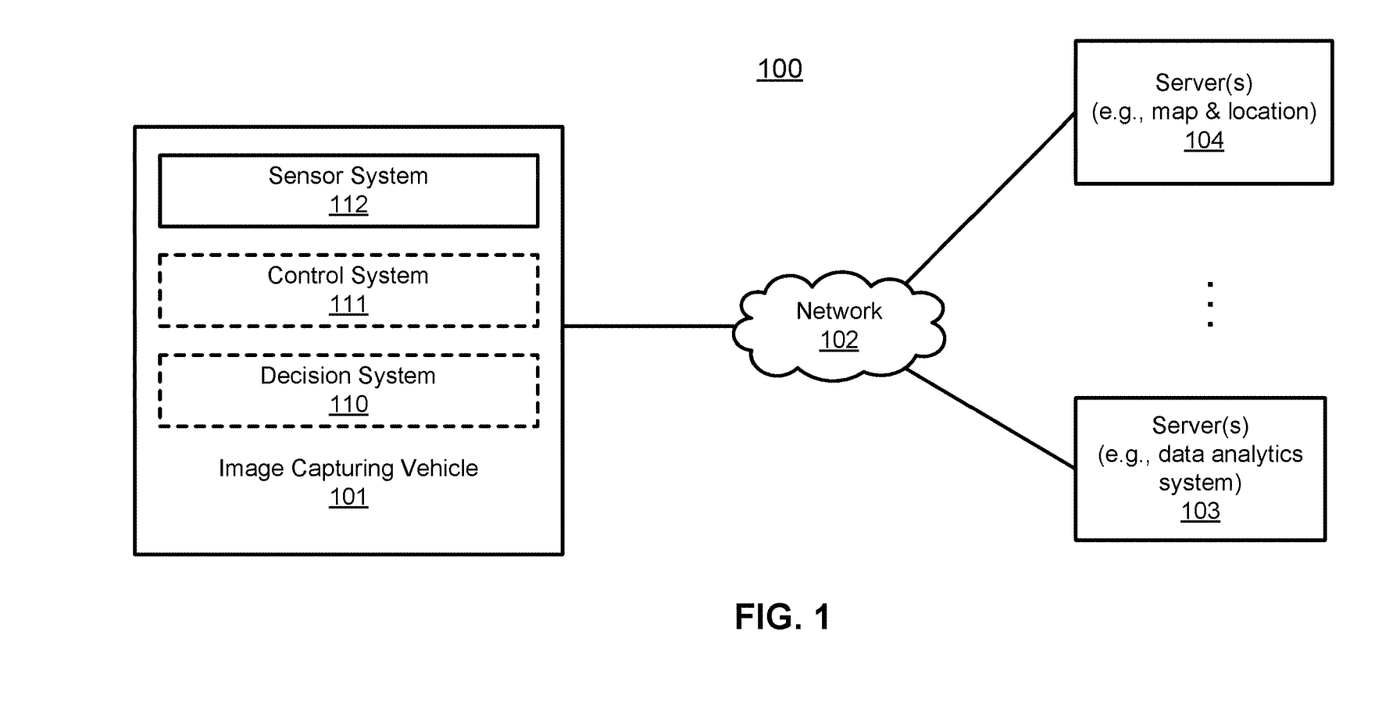
FIG. 1 is a block diagram illustrating a system environment for an image capturing vehicle according to one embodiment of the disclosure.

FIG. 1 is a block diagram illustrating a system environment 100 for an image capturing vehicle 101 according to one embodiment of the disclosure. The image capturing vehicle 101 may comprise an autonomous driving vehicle, or a non-autonomous driving vehicle including one or more sensor components (e.g. a camera, GPS unit, IMU unit, etc.). As described above, because the driving scenario data is generated from image data captured by a cost effective camera (as opposed to more expensive LIDAR equipment) the image data may be derived from any type of vehicle. For example, in one embodiment, image data from an onboard camera of a non-autonomous vehicle may be provided to the driving simulation generating system. In addition, this may even include crowd sourced data from onboard cameras from set of vehicles/users to provide an even more extensive amount of driving scenario data to be processed for driving simulations. Referring back to FIG. 1, the system 100 includes an image capturing vehicle 101 that may be communicatively coupled to one or more servers 103-104 over a network 102. Although there is one autonomous vehicle shown, multiple autonomous vehicles can be coupled to each other and/or coupled to servers 103-104 over network 102.

An autonomous driving vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Accordingly, in one embodiment, image capturing vehicle 101 can operate in a manual mode, a full autonomous mode, or a partial autonomous mode.

In one embodiment, image capturing vehicle 101 may optionally (e.g. when the image capturing vehicle 101 is an autonomous driving vehicle) include a decision system 110, and vehicle control system 111. The image capturing vehicle 101 may further include certain common components included in ordinary vehicles, such as, an engine, wheels, steering wheel, transmission, etc., which may be controlled by vehicle control system 111 and/or decision system 110 using a variety of communication signals and/or commands, such as, for example, acceleration signals or commands, deceleration signals or commands, steering signals or commands, braking signals or commands, etc.

Components 110-112 may be communicatively coupled to each other via an interconnect, a bus, a network, or a combination thereof. For example, components 110-112 may be communicatively coupled to each other via a controller area network (CAN) bus. A CAN bus is a vehicle bus standard designed to allow microcontrollers and devices to communicate with each other in applications without a host computer. For example, it may include a message-based protocol, designed originally for multiplex electrical wiring within automobiles, but is also used in many other contexts.

Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

Server 104 may provide map and location information that may be used to process image data further described herein. In one embodiment, the server 104 may provide traffic related data that may be included as part of a simulation. Server 103 may be a data analytics system to perform data analytics services for a variety of clients. In one embodiment, the server 103 may include driving statistics including information indicating the driving commands (e.g., throttle, brake, steering commands) issued and responses of the vehicles (e.g., speeds, accelerations, decelerations, directions) captured by sensors of the vehicles at different points in time. Driving statistics may further include information describing the driving environments at different points in time, such as, for example, routes (including starting and destination locations), MPOIs, road conditions, weather conditions, etc. Accordingly, such additional information may be provided as input to the simulation generating system.

Figure 2:
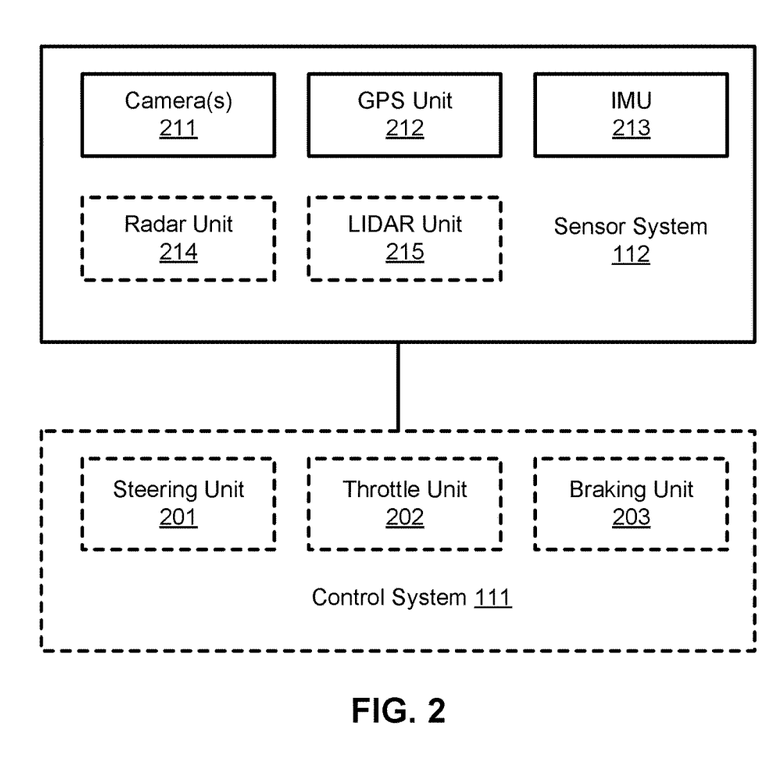
FIG. 2 is a block diagram illustrating a sensor and control system according to one embodiment of the disclosure.

Referring now to FIG. 2, in one embodiment, sensor system 112 may include one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the vehicle 101. Cameras 211 may include one or more devices to capture images of the environment surrounding the vehicle 101. Cameras 211 may be still cameras and/or video cameras. A camera may be mechanically movable, for example, by mounting the camera on a rotating and/or tilting a platform. IMU unit 213 may sense position and orientation changes of the vehicle 101 based on inertial acceleration. In addition, the sensor system 112 may optionally (e.g. when the image capturing vehicle 101 is autonomous driving vehicle) include a radar unit 214 and/or a LIDAR unit 215. The radar unit 214 may represent a system that utilizes radio signals to sense objects within the local environment of the vehicle 101. In some embodiments, in addition to sensing objects, radar unit 214 may additionally sense the speed and/or heading of the objects. LIDAR unit 215 may sense objects in the environment in which the vehicle 101 is located using lasers. LIDAR unit 215 could include one or more laser sources, a laser scanner, and one or more detectors, among other system components.

Sensor system 112 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the vehicle 101. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 may include steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

When the image capturing vehicle 101 is an autonomous driving vehicle, some or all of the functions of vehicle 101 may be controlled or managed by decision system 110, especially when operating in an autonomous driving mode. Decision system 110 includes the necessary hardware (e.g., processor(s), memory, storage) and software (e.g., operating system, planning and routing programs) to receive information from sensor system 112, control system 111, to process the received information, plan a route or path from a starting point to a destination point, and then drive vehicle 101 based on the planning and control information. Alternatively, decision system 110 may be integrated with vehicle control system 111.

While autonomous vehicle 101 is moving along the route, decision system 110 may also obtain real-time traffic information from a traffic information system or server (TIS). Note that servers 103-104 may be operated by a third party entity. Alternatively, the functionalities of servers 103-104 may be integrated with decision system 110. Based on the real-time traffic information, MPOI information, and location information, as well as real-time local environment data detected or sensed by sensor system 112 (e.g., obstacles, objects, nearby vehicles), decision system 110 can plan an optimal route and drive vehicle 101, for example, via control system 111, according to the planned route to reach the specified destination safely and efficiently.

Figure 3:
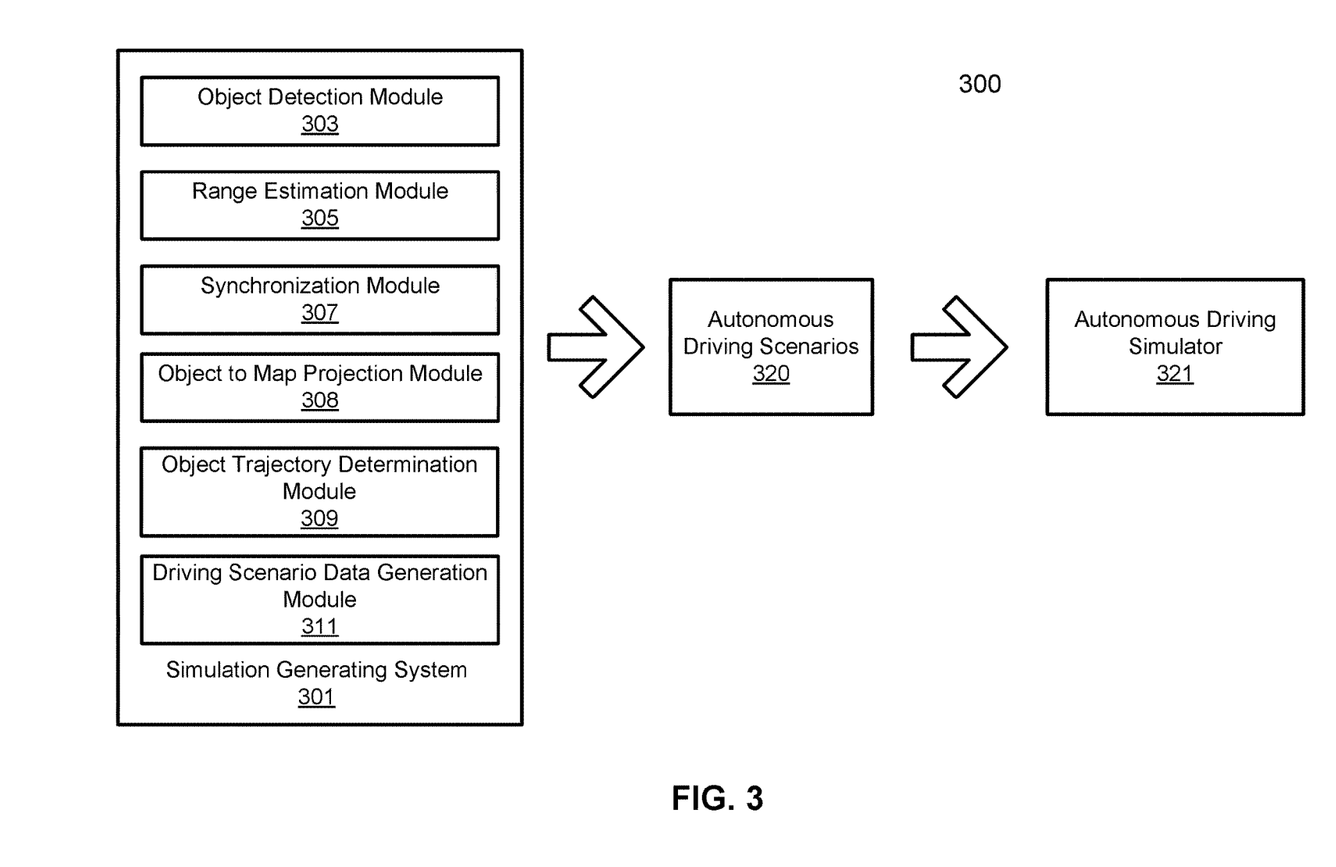
FIG. 3 is a block diagram illustrating an example system used to generate a driving scenario for an autonomous driving simulation according to one embodiment of the disclosure.

FIG. 3 is a block diagram illustrating an example system 300 used to generate a driving scenario for an autonomous driving simulation according to one embodiment of the disclosure. Referring to the embodiment of FIG. 3, system 300 may include a simulation generating system 301. In one embodiment, the simulation generating system 301 may include one or more components (or modules) to perform tasks (or procedures, methods, processes, etc.) such as object detection module 303, range estimation module 305, synchronization module 307, object to map projection module 308, object trajectory determination module 309, and driving scenario data generation module 311. Accordingly, one or more of these tasks may produce data for creating driving scenarios 320 that may be used for an autonomous driving simulator 321.

Object detection module 303 is configured to detect objects in the image data. The detection may include identifying any objects that may be relevant to the decision-making of an autonomous driving vehicle. For example, in one embodiment, objects may include other traffic entities such as other vehicles (autonomous or non-autonomous), pedestrians, cyclists, etc. In addition, in one embodiment, objects may also include non-traffic related (e.g. static) objects such as obstructions, traffic control objects (e.g. pylons, barriers, traffic signs, electronic signs, etc.). The object detection may include processing the image data (e.g. video). In one embodiment, object detection may operate at the frame level by treating the video as a sequence of images. Accordingly, the detection may include identifying objects within particular frames of the image data. The object detection may implement any suitable technique to identify objects within the image data.

In one embodiment, the object detection 303 may implement a machine learning algorithm. For example, a deep learning algorithm such as a Fast Region-based Convolutional Network method (Fast R-CNN) may be implemented for object detection. The detection may include performing various manipulations on the two-dimensional image data. For example, the detection may include identifying objects using various referencing techniques such as overlaying a boundary box around the identified object. Accordingly, the boundary box for the identified object may be referenced throughout a sequence of images during processing.

Range estimation module 305 is configured to estimate movement characteristics of the object. For example, the movement characteristics may include a distance (or position) and velocity of an identified object. In one embodiment, the relative distance and/or velocity may be relative to the image capturing vehicle 101. In one embodiment, the estimation may operate at the frame level and may analyze the image data and determine movement characteristics of the identified object based on any suitable method. For example, the estimation may be based on a perspective projection calculation as known in the art. For instance, the calculation may be based on determining a height of the camera from the ground and the relative size of the object within the image. Such a calculation in some embodiments may include referencing the boundary box used to identify the object. Accordingly, based on the relative size of the object within an image (or sequence of images), a distance (or position) of the object from the vehicle 101 may be calculated.

The estimation may also include determining a relative movement of the object. For example, the estimation may include a relative velocity of the object. For example, based on the velocity of the image capturing vehicle 101, and the distance of the object relative to the vehicle during a time interval (e.g. a sequence of frames), a velocity of the object may be determined. For instance, determining that an object directly in front of the image capturing vehicle 101 is moving further away (e.g. object becoming smaller in a sequence of images) while the image capturing vehicle 101 is driving, would result in calculations indicating the object has a greater relative velocity than the vehicle 101.

Synchronization module 307 is configured to determine an absolute position and/or velocity of the object. As referred to herein, in one embodiment, an absolute position may refer to a position with respect to a base map. For example, in one embodiment, a base map may use GPS coordinates to identify a position of an object. In one embodiment, the synchronization may obtain GPS information (e.g. from the GPS unit 212) and/or IMU information (e.g. from the IMU 213) of the image capture vehicle 101. Accordingly, based on this obtained information, the system may determine an absolute position and velocity of the image capture vehicle 101. This information may then be synchronized with the relative position and the relative velocity determined for the identified object. For example, a relative position of the image capturing vehicle 101 at a particular time (e.g. frame) may be synchronized with the relative distance of the object from the vehicle at the same point in time (e.g. frame). Based on the synchronization, an absolute position and/or velocity of the object may be calculated. For example, the GPS coordinates of the identified object, or the actual velocity of the identified object may be calculated.

Accordingly, based on the above analysis, the object may then be included within a frame of reference such as a base map. Object to map projection module 308 is configured to map the object onto a terrain (e.g. base map of roads corresponding to the location of the driving scenario) to provide a frame of reference and to re-create the real-life traffic environment from which the image data was obtained.

Object trajectory determination module 308 is configured to determine a trajectory of the identified object based on the position of the identified object over a period of time (e.g. sequence of frames). In one embodiment, the velocity (relative or absolute) may be adjusted based on the determined trajectory of the object. In addition, the trajectory may also be smoothed by eliminating outliner calculations (e.g. abnormal frames).

Accordingly, the system may further include driving scenario data generation module 311 to generate configuration data for driving scenarios 320. In one embodiment, the data generation may include configuring data (e.g. object, file, data structure, etc.) to capture characteristics of the identified object. For example, the data may include the type of object (e.g. type of vehicle, whether it is a pedestrian, etc.), position (relative or absolute), the velocity (relative or absolute), the trajectory, and map information, as well as any other type of information. For example, this driving scenario data may then be provided to the driving simulator to project the object onto a base map to generate a three-dimensional driving simulation by the autonomous driving simulator 321.

It should be noted with respect to FIGS. 1-3, some or all of modules (components, or systems) shown in may be implemented in software, hardware, or a combination thereof. For example, these modules may be installed in persistent storage device, loaded into memory, and executed by one or more processors. In addition, such components (e.g. modules and systems) can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
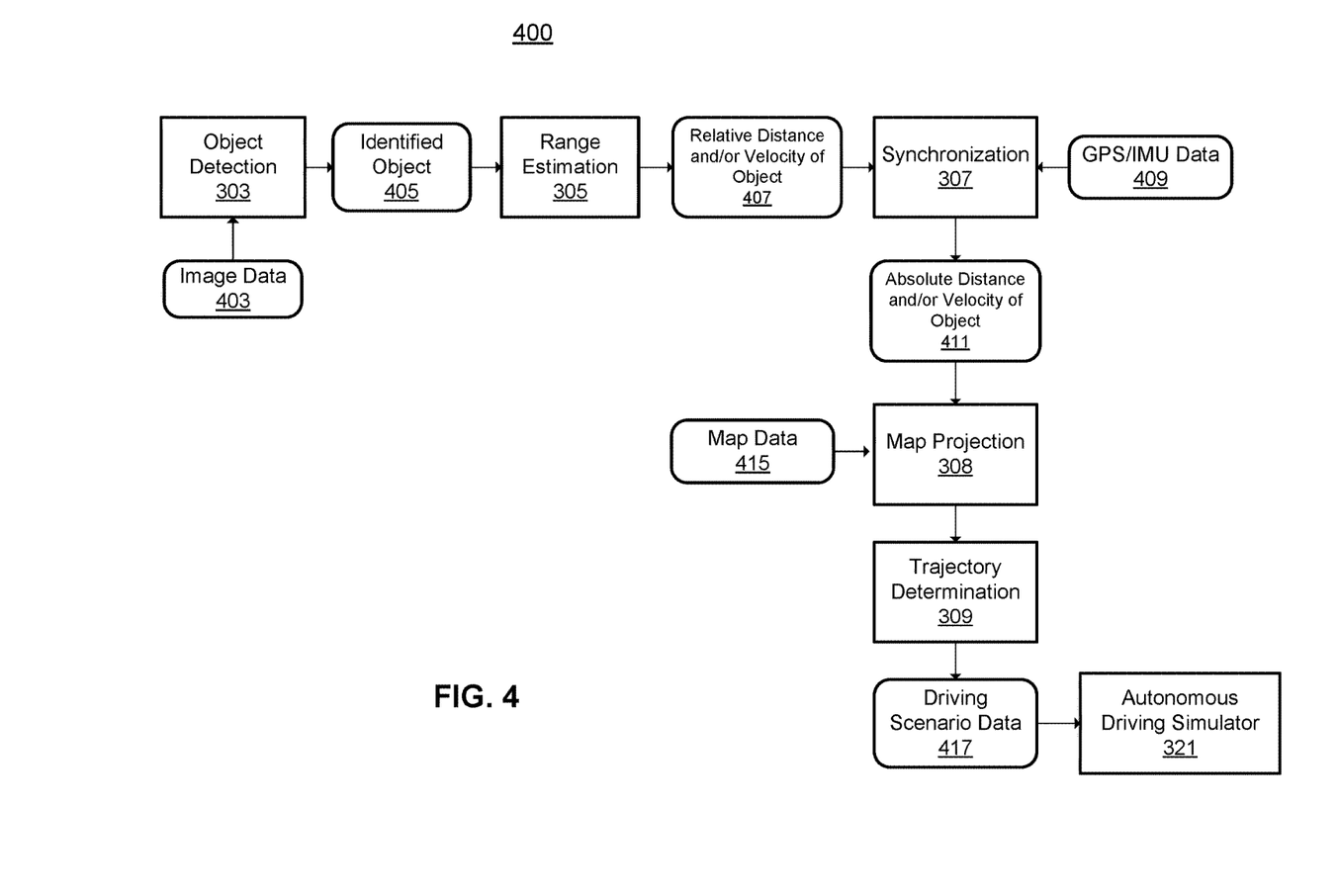
FIG. 4 is an example process flow diagram of generating driving scenario simulation data according to an embodiment of the disclosure.

FIG. 4 is an example process flow diagram 400 of generating driving scenario simulation data according to an embodiment of the disclosure. Process 400 may be performed by a system (e.g. system 300), which may obtain image data 403. The image data 403 may be, for example, image data obtained from a live driving scenario as described above. The system may perform object detection 303 as described above to detect one or more objects within the image data (e.g. other vehicles, pedestrians, cyclists, etc.). For example, an identified object 405 may be represented by a boundary in a sequence of frames. As referred to herein, a sequence of frame may include every frame of image data (e.g. video), or a portion of the frames (e.g. every other frame, every x frame, etc.). For instance, only a subset of the frames may be processed for efficiency purposes.

Based on the identified object, a range estimation 305 as described above may be performed to determine (e.g. output) a distance and/or velocity of the identified object 407 relative to the vehicle 101. The system may perform a synchronization 307 as described above. The synchronization may obtain GPS and/or IMU information 409 for the image capture vehicle 101 and the data may be synchronized with the relative distance and/or velocity data for the object. By performing a synchronization between, for example, frames of the relative distance and/or velocity information and the absolute position of the image capture vehicle, an absolute (e.g. relative to a base map) distance and/or velocity of the identified object 411 may be determined. The system may obtain map data 415 to generate a map projection 309 (or object to map projection). For example, the object may be overlaid onto a base map. The system may then perform a trajectory determination 308, which may include adjusting the velocity based on a trajectory of the identified object. As described above, simulation configuration data such as driving scenario data 4017 may be generated for input into the autonomous driving simulator 321.

Figure 5:
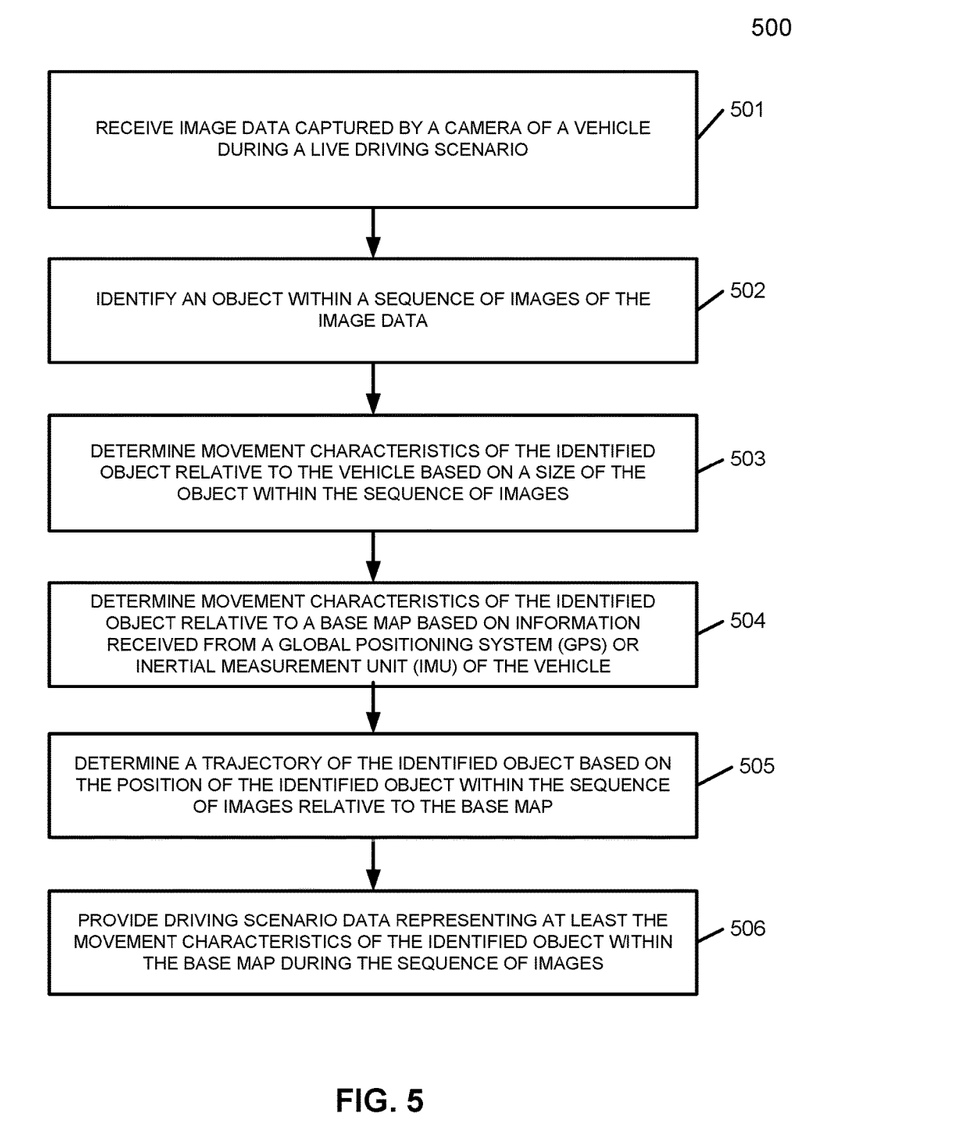
FIG. 5 is an example diagram illustrating a method of generating driving scenario data according to an embodiment of the disclosure.

FIG. 5 is an example diagram 500 illustrating a method of generating driving scenario data according to an embodiment of the disclosure. Process 500 may use processing logic which may include software, hardware, or a combination thereof. For example, process 500 may be performed by a system (e.g. systems 300), or a computing or data processing system or device.

In operation 501, the system may receive image data captured by a camera of a vehicle (e.g. image capturing vehicle 101) during a live driving scenario. In operation 502, the system may identify an object within a sequence of images of the image data. In operation 503, the system may determine movement characteristics of the identified object relative to the vehicle based on a size of the object within the sequence of images. In one embodiment, the movement characteristics of the identified object may include a position and a velocity of the identified object.

In operation 504, the system may determine movement characteristics of the identified object relative to a base map based on location information received from a global positioning system (GPS) of the vehicle. In one embodiment, the system may further determine movement characteristics of the identified object relative to the base map based on inertia information received from an inertial measurement unit (IMU) of the vehicle. In addition, the location information may be associated with one or more of the sequence of images used to determine the movement characteristics of the identified object relative to the vehicle.

In operation 505, the system may determine a trajectory of the identified object based on determining the position of the identified object within the sequence of images relative to the base map. In operation 506, the system may provide driving scenario data representing at least the movement characteristics of the identified object within the base map during the sequence of images. For example, the driving scenario data may be used to incorporate the identified object within an autonomous driving simulation. In one embodiment, the driving scenario data includes at least an identifier of a type of object identified, a position of the identified object, a velocity of the identified object, and a trajectory of the identified object.

Figure 6:
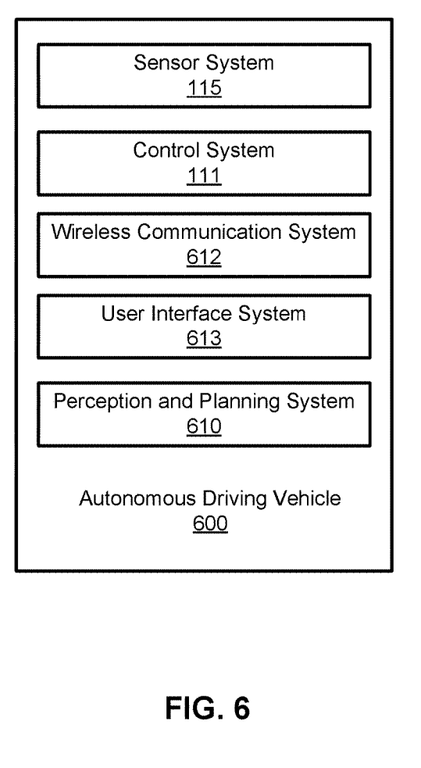
FIG. 6 is a block diagram illustrating an example of an autonomous driving vehicle according to one embodiment.

FIG. 6 is a block diagram illustrating an example of an autonomous driving vehicle according to one embodiment. Autonomous driving vehicle 600 may be implemented as part of vehicle 101 of FIG. 1. Referring to FIG. 6, autonomous vehicle 600 includes, but is not limited to, perception and planning system 610, vehicle control system 111, wireless communication system 612, user interface system 613, and sensor system 115. Autonomous vehicle 600 may further include certain common components included in ordinary vehicles, such as, an engine, wheels, steering wheel, transmission, etc., which may be controlled by vehicle control system 111 and/or perception and planning system 610 using a variety of communication signals and/or commands, such as, for example, acceleration signals or commands, deceleration signals or commands, steering signals or commands, braking signals or commands, etc.

Wireless communication system 612 is to allow communication between autonomous vehicle 600 and external systems, such as devices, sensors, other vehicles, etc. For example, wireless communication system 612 can wirelessly communicate with one or more devices directly or via a communication network, such as servers 103-104 over network 102 of FIG. 1. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within the vehicle), for example, using an infrared link, Bluetooth, etc. User interface system 613 may be part of peripheral devices implemented within vehicle 600 including, for example, a keyword, a touch screen display device, a microphone, and a speaker, etc.

Some or all of the functions of autonomous vehicle 600 may be controlled or managed by perception and planning system 610, especially when operating in an autonomous driving mode. Perception and planning system 610 includes the necessary hardware (e.g., processor(s), memory, storage) and software (e.g., operating system, planning and routing programs) to receive information from sensor system 115, control system 111, wireless communication system 612, and/or user interface system 613, process the received information, plan a route or path from a starting point to a destination point, and then drive vehicle 600 based on the planning and control information. Alternatively, perception and planning system 610 may be integrated with vehicle control system 111.

For example, a user as a passenger may specify a starting location and a destination of a trip, for example, via a user interface. Perception and planning system 610 obtains the trip related data. For example, perception and planning system 610 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 610.

While autonomous vehicle 600 is moving along the route, perception and planning system 610 may also obtain real-time traffic information from a traffic information system or server (TIS). Based on the real-time traffic information, MPOI information, and location information, as well as real-time local environment data detected or sensed by sensor system 115 (e.g., obstacles, objects, nearby vehicles), perception and planning system 610 can plan an optimal route and drive vehicle 600, for example, via control system 111, according to the planned route to reach the specified destination safely and efficiently.

Figure 7:
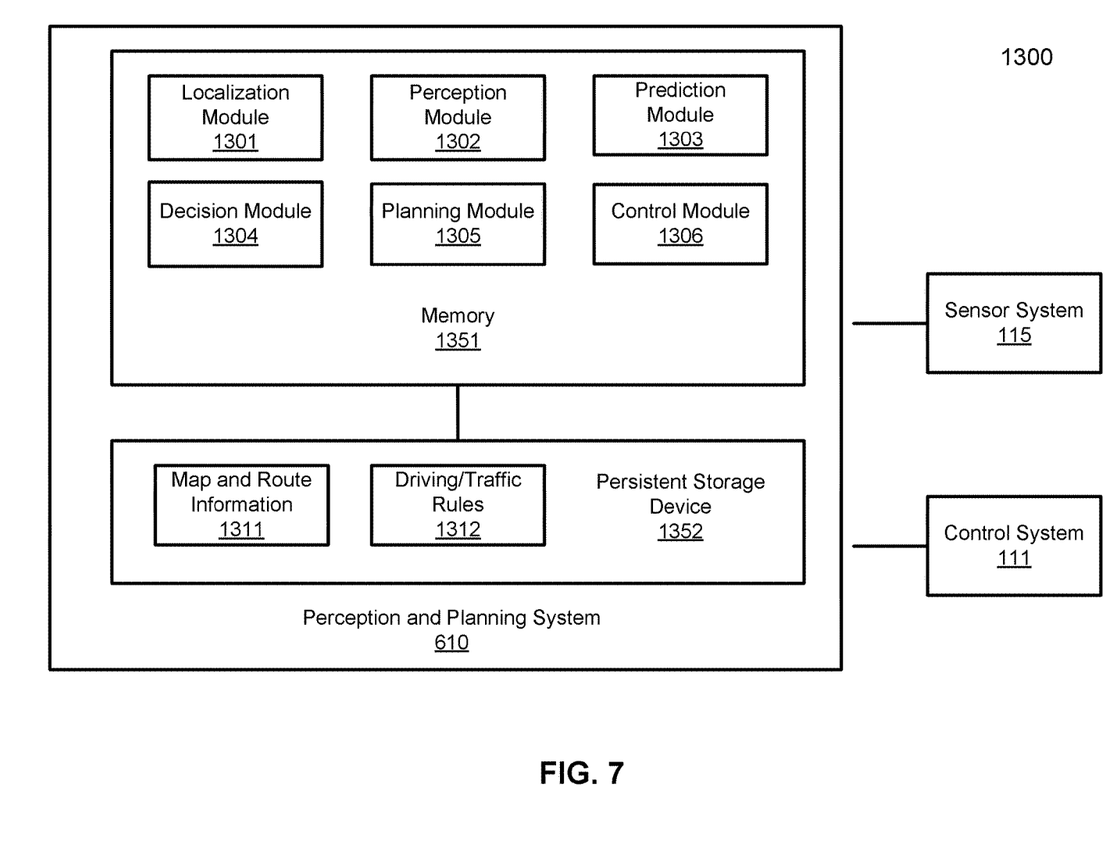
FIG. 7 is a block diagram illustrating an example of a perception and planning system used with an autonomous vehicle according to one embodiment.

FIG. 7 is a block diagram illustrating an example of a perception and planning system used with an autonomous vehicle according to one embodiment. System 1300 may be implemented as a part of autonomous vehicle 600 of FIG. 6 including, but is not limited to, perception and planning system 610, control system 111, and sensor system 115. Referring to FIG. 7, perception and planning system 610 includes, but is not limited to, localization module 1301, perception module 1302, prediction module 1303, decision module 1304, planning module 1305, and control module 1306.

Some or all of modules 1301-1306 may be implemented in software, hardware, or a combination thereof. For example, these modules may be installed in persistent storage device 1352, loaded into memory 1351, and executed by one or more processors (not shown). Note that some or all of these modules may be communicatively coupled to or integrated with some or all modules of vehicle control system 111 of FIG. 2. Some of modules 1301-1306 may be integrated together as an integrated module.

Localization module 1301 determines a current location of autonomous vehicle 1300 (e.g., leveraging GPS unit 212) and manages any data related to a trip or route of a user. Localization module 1301 (also referred to as a map and route module) manages any data related to a trip or route of a user. A user may log in and specify a starting location and a destination of a trip, for example, via a user interface. Localization module 1301 communicates with other components of autonomous vehicle 1300, such as map and route information 1311, to obtain the trip related data. For example, localization module 1301 may obtain location and route information from a location server and a map and POI (MPOI) server. A location server provides location services and an MPOI server provides map services and the POIs of certain locations, which may be cached as part of map and route information 1311. While autonomous vehicle 1300 is moving along the route, localization module 1301 may also obtain real-time traffic information from a traffic information system or server.

Based on the sensor data provided by sensor system 115 and localization information obtained by localization module 1301, a perception of the surrounding environment is determined by perception module 1302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 1302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 1302 can also detect objects based on other sensors data provided by other sensors such as a radar and/or LIDAR.

For each of the objects, prediction module 1303 predicts what the object will behave under the circumstances. The prediction is performed based on the perception data perceiving the driving environment at the point in time in view of a set of map/rout information 1311 and traffic rules 1312. For example, if the object is a vehicle at an opposing direction and the current driving environment includes an intersection, prediction module 1303 will predict whether the vehicle will likely move straight forward or make a turn. If the perception data indicates that the intersection has no traffic light, prediction module 1303 may predict that the vehicle may have to fully stop prior to enter the intersection. If the perception data indicates that the vehicle is currently at a left-turn only lane or a right-turn only lane, prediction module 1303 may predict that the vehicle will more likely make a left turn or right turn respectively.

For each of the objects, decision module 1304 makes a decision regarding how to handle the object. For example, for a particular object (e.g., another vehicle in a crossing route) as well as its metadata describing the object (e.g., a speed, direction, turning angle), decision module 1304 decides how to encounter the object (e.g., overtake, yield, stop, pass). Decision module 1304 may make such decisions according to a set of rules such as traffic rules or driving rules 1312, which may be stored in persistent storage device 1352.

Based on a decision for each of the objects perceived, planning module 1305 plans a path or route for the autonomous vehicle, as well as driving parameters (e.g., distance, speed, and/or turning angle). That is, for a given object, decision module 1304 decides what to do with the object, while planning module 1305 determines how to do it. For example, for a given object, decision module 1304 may decide to pass the object, while planning module 1305 may determine whether to pass on the left side or right side of the object. Planning and control data is generated by planning module 1305 including information describing how vehicle 1300 would move in a next moving cycle (e.g., next route/path segment). For example, the planning and control data may instruct vehicle 1300 to move 10 meters at a speed of 30 mile per hour (mph), then change to a right lane at the speed of 25 mph.

Based on the planning and control data, control module 1306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 1305 plans a next route segment or path segment, for example, including a target position and the time required for the ADV to reach the target position. Alternatively, planning module 1305 may further specify the specific speed, direction, and/or steering angle, etc. In one embodiment, planning module 1305 plans a route segment or path segment for the next predetermined period of time such as 5 seconds. For each planning cycle, planning module 1305 plans a target position for the current cycle (e.g., next 5 seconds) based on a target position planned in a previous cycle. Control module 1306 then generates one or more control commands (e.g., throttle, brake, steering control commands) based on the planning and control data of the current cycle.

Note that decision module 1304 and planning module 1305 may be integrated as an integrated module. Decision module 1304/planning module 1305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 613. The navigation system may update the driving path dynamically while the autonomous vehicle is in operation. The navigation system can incorporate data from a GPS system and one or more maps so as to determine the driving path for the autonomous vehicle.

Decision module 1304/planning module 1305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 8:
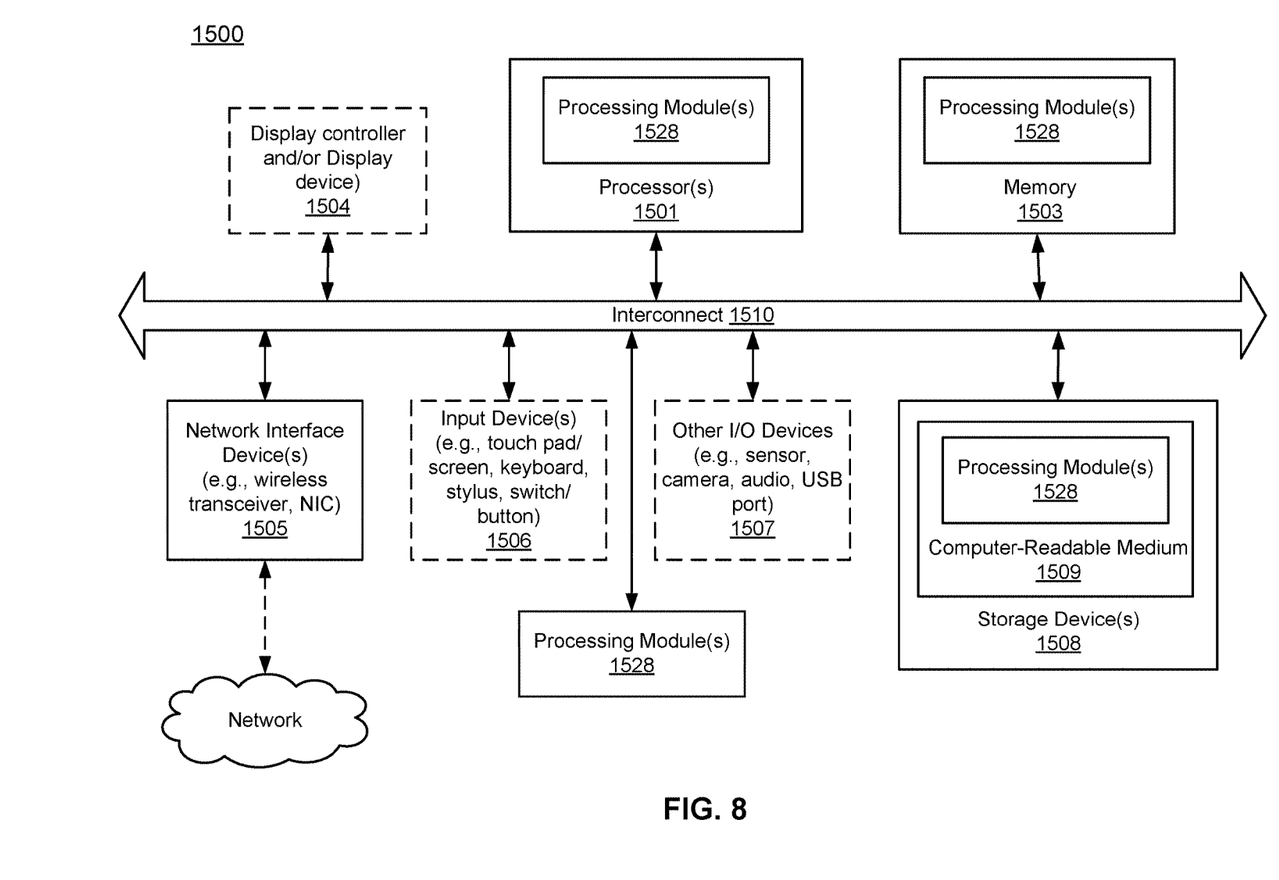
FIG. 8 is a block diagram illustrating an example computing system used in conjunction with one or more embodiments of the disclosure.

FIG. 8 is a block diagram illustrating an example computing system used in conjunction with one or more embodiments of the disclosure. For example, system 1500 may represent any of data processing systems described above performing any of the processes or methods described above, such as, for example, one or more components 110-112 of the autonomous vehicle 101, perception and planning system 610, or servers 103-104 described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device(s) 1505 may include a wireless transceiver and/or a network interface card (NIC).

The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-accessible storage medium 1509 (also known as a machine-readable storage medium or a computer-readable medium) on which is stored one or more sets of instructions or software (e.g., component, module, unit, and/or logic 1528) embodying any one or more of the methodologies or functions described herein.

Component/module/unit/logic (e.g. processing modules) 1528 may represent any of the components described above, such as, for example, components of simulation generating system 301, decision system 110, sensor system 112, and control system 111 (and related modules and sub-modules). Component/module/unit/logic 1528 may also reside, completely or at least partially, within memory 1503 and/or within processor 1501 during execution thereof by data processing system 1500, memory 1503 and processor 1501 also constituting machine-accessible storage media. In addition, component/module/unit/logic 1528 can be implemented as firmware or functional circuitry within hardware devices. Further, component/module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; and phase-change memory).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for generating scenario data for a driving simulation, comprising:

receiving image data captured by a camera of a vehicle during a live driving scenario;
identifying an object within a sequence of images of the image data;
determining movement characteristics of the identified object relative to the vehicle based on a size of the object within the sequence of images;
determining movement characteristics of the identified object relative to a base map based on location information received from a global positioning system (GPS) of the vehicle, wherein the location information is associated with one or more of the sequence of images used to determine the movement characteristics of the identified object relative to the vehicle; and
providing driving scenario data representing at least the movement characteristics of the identified object within the base map during the sequence of images.

2. The method of claim 1, wherein the movement characteristics of the identified object includes a position and a velocity of the identified object.

3. The method of claim 2, further comprising determining a trajectory of the identified object based on determining the position of the identified object within the sequence of images relative to the base map.

4. The method of claim 1, wherein determining movement characteristics of the identified object relative to the base map is further based on inertia information received from an inertial measurement unit (IMU) of the vehicle.

5. The method of claim 1, wherein the location information is associated with one or more of the sequence of images based on a time stamp of the location information corresponding to a time stamp of the one or more of the sequence of images.

6. The method of claim 1, wherein the driving scenario data includes at least an identifier of a type of object identified, a position of the identified object, a velocity of the identified object, and a trajectory of the identified object.

7. The method of claim 1, wherein the driving scenario data is used to incorporate the identified object within an autonomous driving simulation.

8. The method of claim 1, wherein the image data captured is a video and the sequence of images are frames of the video.

9. A data processing system for generating scenario data for a driving simulation, comprising:
a processor; and
a memory coupled to the processor to store instructions, which when executed by the processor, cause the processor to perform operations, the operations including:
receiving image data captured by a camera of a vehicle during a live driving scenario;
identifying an object within a sequence of images of the image data;
determining a position or a velocity of the identified object relative to the vehicle based on a size of the object within the sequence of images;
determining a position or a velocity of the identified object relative to a base map based on location information received from a global positioning system (GPS) of the vehicle or inertia information received from an inertial measurement unit (IMU) of the vehicle, wherein the location information or the inertia information is associated with one or more of the sequence of images used to determine the position or the velocity of the identified object relative to the vehicle; and
providing driving scenario data representing at least the position or the velocity of the identified object within the base map during the sequence of images, wherein the driving scenario data is used to incorporate the identified object within an autonomous driving simulation.

10. The system of claim 9, the operations further comprising determining a trajectory of the identified object based on determining the position of the identified object within the sequence of images relative to the base map.

11. The system of claim 9, wherein the location information or inertia information is associated with one or more of the sequence of images based on a time stamp of the location information or inertia information corresponding to a time stamp of the one or more of the sequence of images.

12. The system of claim 9, wherein the driving scenario data includes at least an identifier of a type of object identified, a position of the identified object, a velocity of the identified object, and a trajectory of the identified object.

13. A non-transitory machine-readable medium having instructions stored therein, which when executed by a processor, cause the processor to perform operations for providing autonomous driving control for a vehicle, the operations comprising:
receiving image data captured by a camera of a vehicle during a live driving scenario;
identifying an object within a sequence of images of the image data;
determining movement characteristics of the identified object relative to the vehicle based on a size of the object within the sequence of images;
determining movement characteristics of the identified object relative to a base map based on location information received from a global positioning system (GPS) of the vehicle, wherein the location information is associated with one or more of the sequence of images used to determine the movement characteristics of the identified object relative to the vehicle; and
providing driving scenario data representing at least the movement characteristics of the identified object within the base map during the sequence of images.

14. The medium of claim 13, wherein the movement characteristics of the identified object includes a position and a velocity of the identified object.

15. The medium of claim 14, further comprising determining a trajectory of the identified object based on determining the position of the identified object within the sequence of images relative to the base map.

16. The medium of claim 13, wherein determining movement characteristics of the identified object relative to the base map is further based on inertia information received from an inertial measurement unit (IMU) of the vehicle.

17. The medium of claim 13, wherein the location information is associated with one or more of the sequence of images based on a time stamp of the location information corresponding to a time stamp of the one or more of the sequence of images.

18. The medium of claim 13, wherein the driving scenario data includes at least an identifier of a type of object identified, a position of the identified object, a velocity of the identified object, and a trajectory of the identified object.

19. The medium of claim 13, wherein the driving scenario data is used to incorporate the identified object within an autonomous driving simulation.

20. The medium of claim 13, wherein the image data captured is a video and the sequence of images are frames of the video.

\* \* \* \* \*